United States Patent [19]

Hagiwara

[11] Patent Number: 4,852,161
[45] Date of Patent: Jul. 25, 1989

[54] ECHO CANCELLER USING AN ECHO PATH STATUS DETECTION

[75] Inventor: Yukio Hagiwara, Tokyo, Japan
[73] Assignee: NEC Corporation, Japan
[21] Appl. No.: 58,680
[22] Filed: Jun. 4, 1987

Related U.S. Application Data

[63] Continuation of Ser. No. 644,927, Aug. 27, 1984, abandoned.

[30] Foreign Application Priority Data

Sep. 2, 1983 [JP] Japan .................................. 58-161437

[51] Int. Cl.⁴ ............................................. H04B 3/20
[52] U.S. Cl. .................................... 379/410; 379/407
[58] Field of Search ................. 370/32, 32.1; 379/407, 379/410, 411

[56] References Cited

U.S. PATENT DOCUMENTS

| | | | |
|---|---|---|---|
| 3,836,734 | 9/1974 | Campanella et al. | 379/411 |
| 4,129,753 | 12/1978 | Duttweiler | 379/410 |
| 4,282,411 | 8/1981 | Stewart | 379/406 |
| 4,360,712 | 11/1982 | Horna | 379/410 |
| 4,546,216 | 10/1985 | Tegethoff | 370/32.1 |

Primary Examiner—Jin F. Ng
Assistant Examiner—Randall P. Myers
Attorney, Agent, or Firm—Laff, Whitesel, Conte & Saret

[57] ABSTRACT

In an echo canceller system of the type comprising a circuit for measuring the characteristic of an echo path in accordance with input/output signals of the echo path and cancelling from an actual echo signal an approximate echo path signal synthesized in accordance with the echo characteristic, a level measuring circuit for measuring the level of the residual signal, a residual echo level estimating means for estimating the residual echo level based on the output of the level measuring circuit, and a comparator comparing the output of the residual echo level estimating means with the output of the residual echo level measuring circuit, the output of the comparator controlling the measuring operation of the echo path, there are provided a residual signal level measuring circuit including the residual signal level measuring circuit, a transmitted signal input level measuring circuit, and a detector for detecting an opened state of the echo path and producing an output which controls the residual signal level measuring unit.

3 Claims, 4 Drawing Sheets

ECHO CANCELLER USING AN ECHO PATH STATUS DETECTION

This application is a continuation of application Ser. No. 644,927, filed Aug. 27, 1984, now abandoned.

BACKGROUND OF THE INVENTION

This invention relates to an echo canceller system for cancelling an echo signal in a long distance telephone communication circuit and a conference telephone system.

An echo canceller system has been used for controlling or cancelling echos in a long distance circuit, a broadcasting telephone set, a bidirectional repeater or the like.

In the prior art echo canceller system, however, when the echo signal is mixed with or superposed upon such a disturbance signal as a speech signal or a noise signal and is input to a transmission side, the measuring accuracy of the echo circuit will be decreased. Moreover, the degree of echo cancellation is decreased to a value determined by the ratio between the echo signal and the level of the external disturbance signal which are input to the transmission side.

To prevent such a decrease in the degree of echo cancellation caused by such factors, an echo canceller system has been proposed in which a signal remaining after cancellation (called a residual signal) is used to detect a double talk.

One example of such a prior art echo canceller system will be described later in detail. But such a system has a number of difficulties.

SUMMARY OF THE INVENTION

Accordingly, it is an object of this invention to provide an improved echo canceller system having a simple circuit construction but capable of rapidly detecting and opening a circuit causing an echo without interfering with the performance of a double talk under normal state, thereby preventing an erroneous operation of the double talk detection as well as the degradation of the speech quality.

According to one aspect of this invention, there is provided an echo canceller system of the type comprising an echo path, means for measuring a characteristic of the echo path in accordance with input/output signals of the echo path and cancelling from an actual echo signal an approximate echo path signal synthesized in accordance with the echo path characteristic, a measuring circuit for measuring a level of a residual signal, residual echo level estimating means that estimate the residual echo level based on an output of the residual signal level measuring circuit, and a comparator for comparing an output of the residual echo level estimating means with an output of the residual echo level measuring circuit, the output of the comparator controlling the measuring operation of the echo path, characterized in that there are provided a residual signal level measuring unit including the residual signal level measuring circuit, a transmitted signal input level measuring circuit, and a detector for detecting an opened state of the echo path and producing an output which controls the residual signal level measuring unit.

According to another aspect of this invention, there is provided an echo canceller system of the type comprising an echo path, means for measuring a characteristic of the echo path in accordance with input/output signals of the echo path and cancelling from an actual echo signal an approximate echo path signal synthesized in accordance with the echo path characteristic; a measuring circuit for measuring a level of a residual signal, residual echo level estimating means that estimate the residual echo level based on an output of the residual signal level measuring circuit, and a comparator comparing an output of the residual echo level estimating means with an output of the residual echo level measuring circuit, the output of the comparator controlling the measuring operation of the echo path, characterized in that there are provided a transmitted signal input level measuring circuit, a detector for detecting an opened state of the echo path, and a double talk signal control circuit controlled by an output of the detector for detecting the opened state of the echo path so as to control the output of the comparator.

DESCRIPTION OF THE PREFERRED EMBODIMENTS

Figure 1:
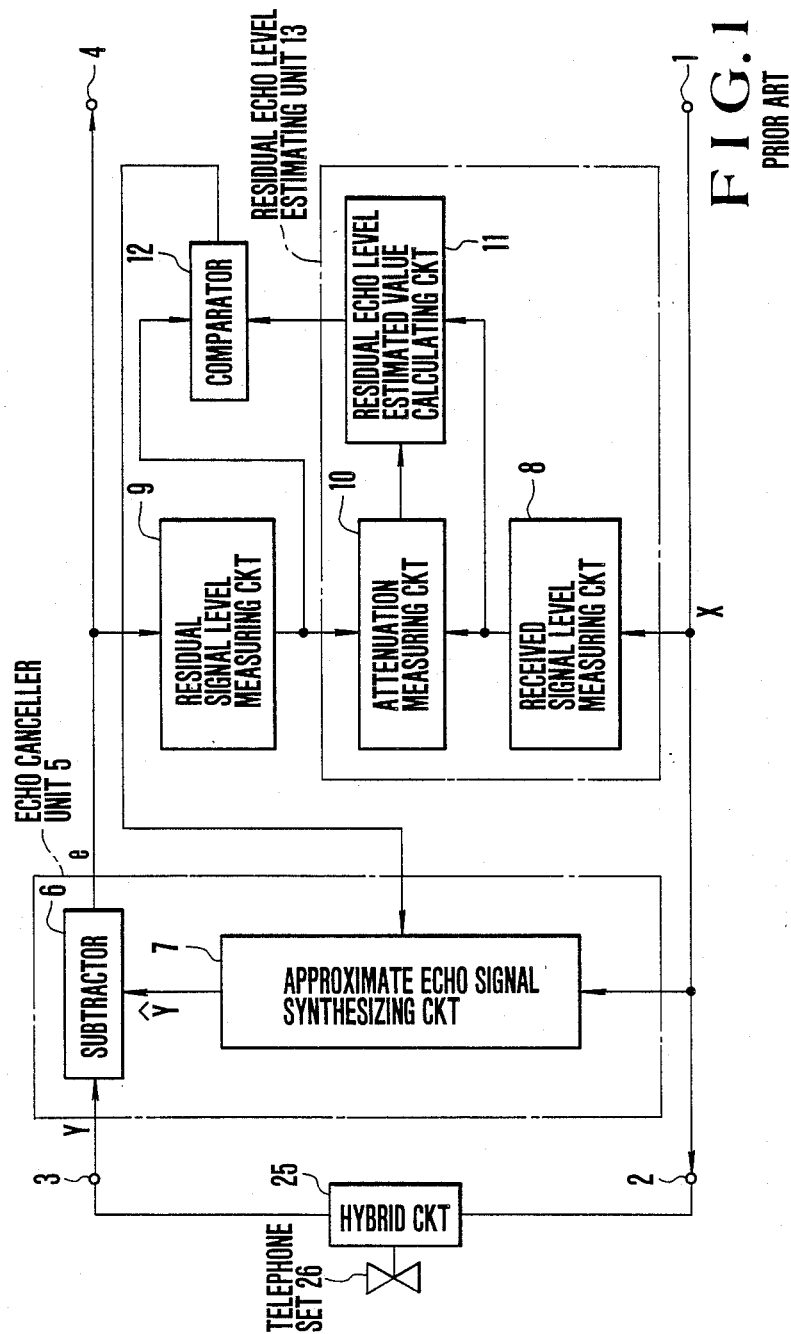
FIG. 1 is a block diagram showing one example of a prior art echo canceller system.

Before describing the invention, a prior art echo canceller system shown in FIG. 1 (corresponding to Japanese Patent Application Laid-open No. 89337/82) will first be described. The system shown in FIG. 1 comprises an input terminal 1 supplied with a received signal, an output terminal 2 of the received signal, an input terminal 3 inputted with a transmitted signal, an output terminal 4 of the transmitted signal, and an echo canceller unit 5 including a subtractor 6 which subtracts the transmitted signal at the input terminal 3, and an approximate echo signal synthesizing circuit 7 having an input which is a signal received from the input terminal 1 and producing a signal that controls the subtractor 6.

An echo path is connected between the terminals 2 and 3 through a hybrid circuit 25 which branches to a telephone set 26. The terminals 1 and 4 are connected to a similar partner echo canceller (not shown) through transmission lines.

The echo canceller unit 5 is constructed by means for measuring the echo characteristic in accordance with input and output signals of an echo path, means responsive to the thus measured echo characteristic to synthesize an approximate echo path signal, and means for cancelling the approximate echo path signal from the actual echo signal.

The system shown in FIG. 1 further comprises a received signal level measuring circuit 8, a residual signal level measuring circuit 9, an attenuation measuring circuit 10 inputted with the outputs of the received signal level measuring circuit 8 and of the residual signal level measuring circuit 9 for measuring the amount of attenuation (sum of echo loss which occurs over the echo path between terminals 2 and 3 and echo cancellation which occurs at the subtractor 6), and a residual echo level estimated value calculating circuit 11 inputted with the outputs of the received signal level measuring circuit 8, and of the attenuation measuring circuit 10 for determining the estimated value of the residual echo level, the residual echo level estimated value calculating circuit 11 constituting a residual echo level estimating unit 13 together with the circuits 8 and 10.

There is also provided a comparator 12 for comparing the output level of the residual echo level estimated value calculating circuit 11 with the output level of the residual signal level measuring circuit 9. The output of the comparator 12 is supplied to the approximate echo signal synthesizing circuit for controlling the measuring operation of the characteristic of the echo path between terminals 2 and 3.

In the operation of the echo canceller system described above, the received signal level and the residual signal level are measured respectively with the received signal level measuring circuit 8 and the residual signal level measuring circuit 9, and in accordance with the results of these measurements, the amount of attenuation (sum of echo loss and echo cancellation) is measured by the attenuation measuring circuit 10. The estimated value of the cancelled echo level is determined by the residual echo level estimated value calculating circuit 11 in accordance with the level measured by the attenuation measuring circuit 10 and the output of the received signal level measuring circuit 8.

Comparator 12 compares the estimated value calculated by the residual echo level estimated value calculating circuit 11 with the output of the residual signal level measuring circuit 9, and the output of the comparator 12 controls the measuring operation of the characteristic of the echo path.

As described above, the received signal level and the residual signal level are measured to estimate, at any time, the amount of attenuation $\widehat{ERL}$ (echo return loss which is the sum of the echo loss and the echo cancellation) thereby determining the estimated value of the residual echo level based on the amount of attenuation and the received signal. The estimated values thus obtained is compared with the residual signal level by comparator 12. The estimated value is adaptively corrected such that the estimated value and the residual signal level would be equal to each other at the time of one way speech of the received signal above that is, of a single talk.

The eliminated echo e can be determined by the following equation:

$$e = Y - \widehat{Y}$$

where
e: residual echo
Y: actual echo
$\widehat{Y}$: pseudo-echo

With such echo canceller system, however, in the presence of a double talk signal, the output of the residual signal level measuring circuit becomes larger than the output of the residual echo level estimated value calculating circuit 11, and the comparator 12 whether there is a double talk signal, thereby stopping the correction of an echo path model (a characteristic of the echo path measured from the input/output signals of the echo path) of the echo canceller unit 5 or decreasing the correction speed.

When the echo path between the terminals 2 and 3 is open, the received signal which is inputted to the input terminal 1 enters into the residual signal level measuring circuit 9 through the approximate echo signal syntheisizng circuit 7 and the subtractor 6, and its output increases so that the inputted signal is judged by the comparator 12 as if it is a double talk, whereby the correction of the echo model at the echo canceller unit 5 is disadvantageously stopped or the correction speed is decreased.

More particularly, when the echo path is open, Y becomes 0 (zero), and e becomes $-\widehat{Y}$ to increase the residual echo e in absolute value, providing a decision of double talk. This increased residual echo is sent to the transmission side, thereby decreasing the speech quality. For this reason, when the echo path is opened, it is necessary to rapidly converge to zero the echo path model. However, at the time of detecting the double talk, due to the increase in the residual echo caused by the opening of the echo path, the equation $e_L + \widehat{ERL} = X_L$ no longer holds where $e_L$ and $X_L$ represent levels of e and X respectively, so that the received signal is judged as if it were a double talk, thereby causing a stopping of the correction of the echo path model or decrease in the correction speed and degrading the speech quality.

As described above, the invention contemplates an elimination of these defects.

Figure 2:
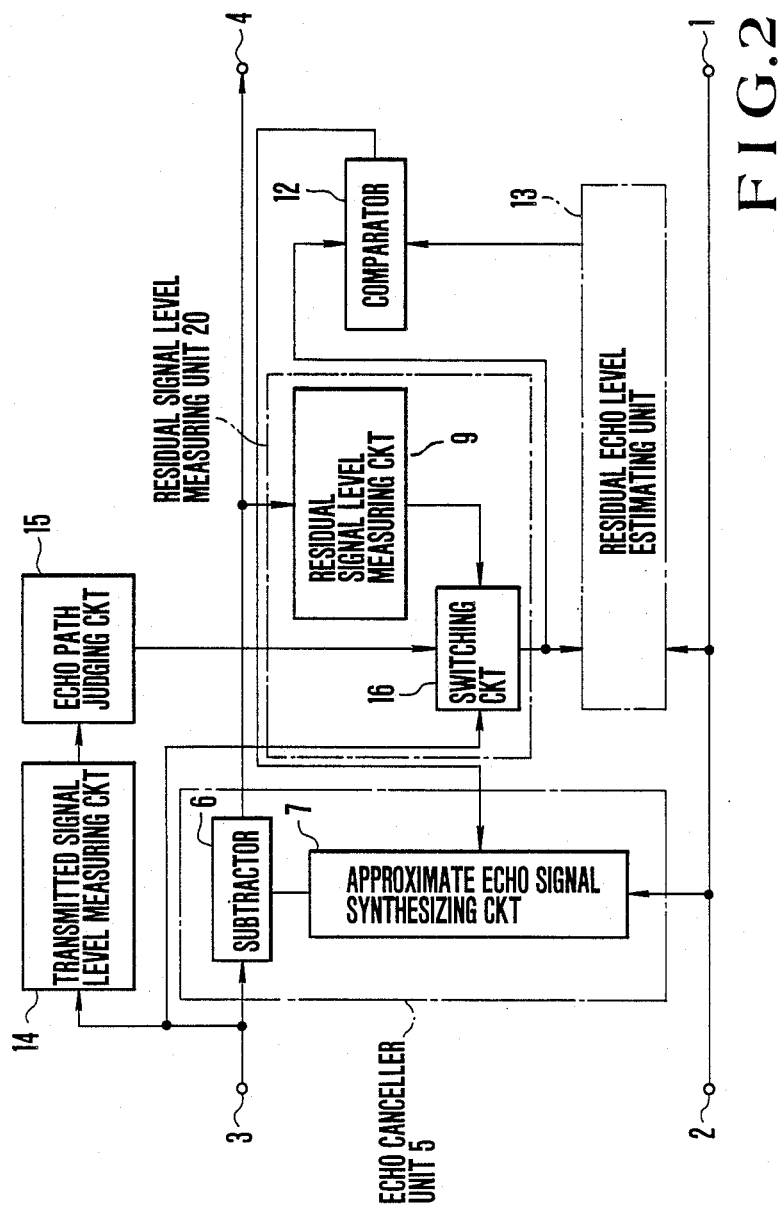
FIG. 2 is a block diagram showing one embodiment of an echo canceller system according to this invention.

FIG. 2 illustrates one embodiment of this invention, in which elements corresponding to those shown in FIG. 1 are designated by the same reference numeral and the echo path is not depicted for simplicity of illustration. The system shown in FIG. 2 comprises a transmitted signal level measuring circuit 14 for measuring the input level of the transmitted signal, an echo path judging circuit 15 for judging the state of the echo path by comparing the output of the transmitted signal level measuring circuit 14 with a preset judging value, the judging circuit 15 constituting an echo path opened state detecting unit that detects the opened state of the echo path. A switching circuit 16 is provided to be inputted with the transmitted signal from input terminal 3 and the output of the residual signal level measuring circuit 9 and controlled by the output of the residual path judging circuit 15, that is, the residual path opened state detecting unit so as to send a residual signal to the residual echo level estimating unit 13. In this embodiment, the residual signal level measuring circuit 9 and the switching circuit 16 constitute a residual signal level measuring unit 20.

The embodiment shown in FIG. 2 operates as follows:

When the echo path is not open, in other words, established, the echo path judging circuit 15 compares the output of the transmitted signal level measuring circuit 14 with a preset judging value (threshold value) so as to output a signal which informs the switching circuit 16 of the fact that the echo path is established. The switching circuit 16 outputs a residual signal to the residual echo level estimating unit 13, whereby the double talk is detected by the operation already described with reference to FIG. 1.

Where the echo path is open, the output produced by the transmitted signal level measuring circuit 14 becomes infinitely small and is compared with the preset judging value at the echo path judging circuit 15 which supplies a signal indicating that the echo path is open to the switching circuit 16. The switching circuit 16 then supplies a transmitted signal (in this case Y=0) to the residual echo level estimating unit 13 and to the comparator 12. For this reason, the comparator 12 does not misjudge the received signal as a double talk, thus converging the echo model to zero.

As described above, according to this invention, it is possible to quickly detect the opened state of the echo path without deteriorating the detecting performance of the double talk under normal state, thus preventing erroneous operation of the detection of the double talk as well as degradation of the quality of the speech.

Figure 3:
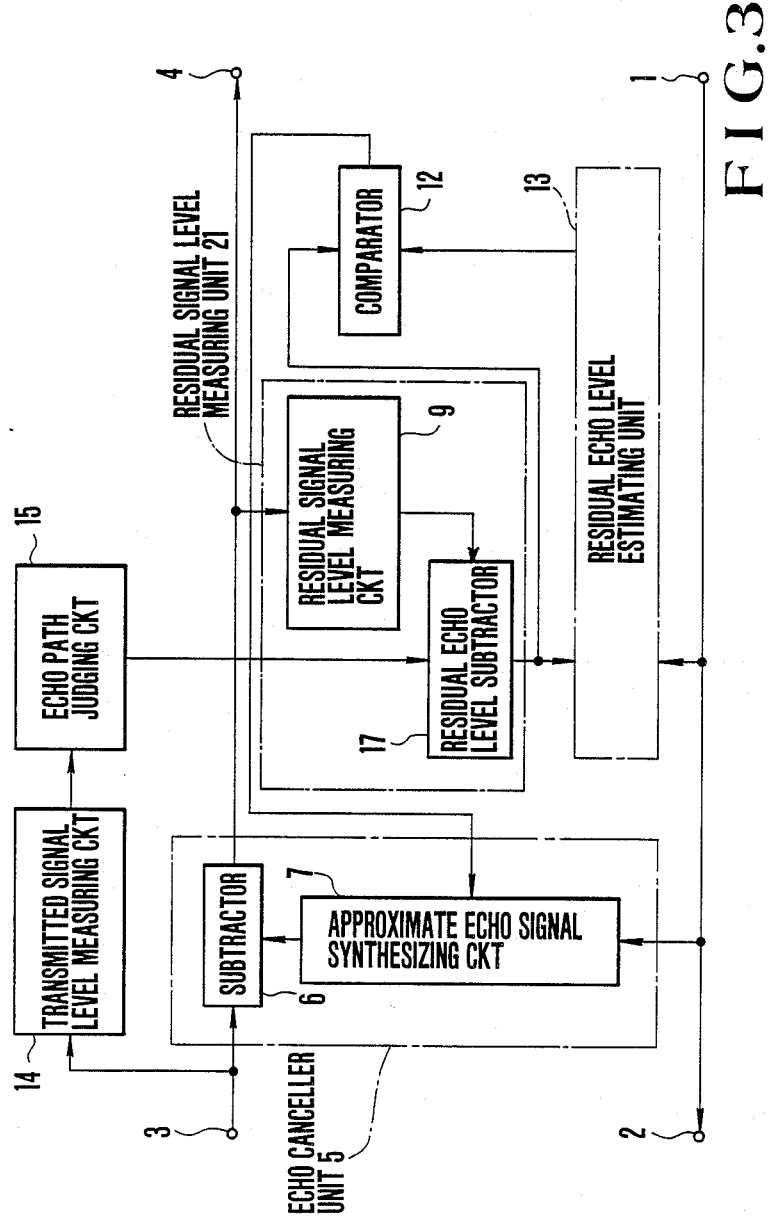
FIG. 3 is a block diagram showing another embodiment of this invention.

FIG. 3 is a block diagram showing a modified embodiment of this invention which is different from the embodiment shown in FIG. 2 in that the switching circuit 16 shown in FIG. 2 is replaced by a residual echo level subtractor 17. When the echo path is judged open, the subtractor 17 decreases the output of the residual signal level measuring circuit 9 to a value which would not be judged as a double talk, and the reduced value (difference) is supplied to the residual echo level estimating unit 13 and the comparator 12. In this modification, the residual signal level measuring circuit 9 and the residual echo level subtractor 17 constitute a residual signal level measuring unit 21.

This modification has the same advantageous effects as the embodiment shown in FIG. 2.

Figure 4:
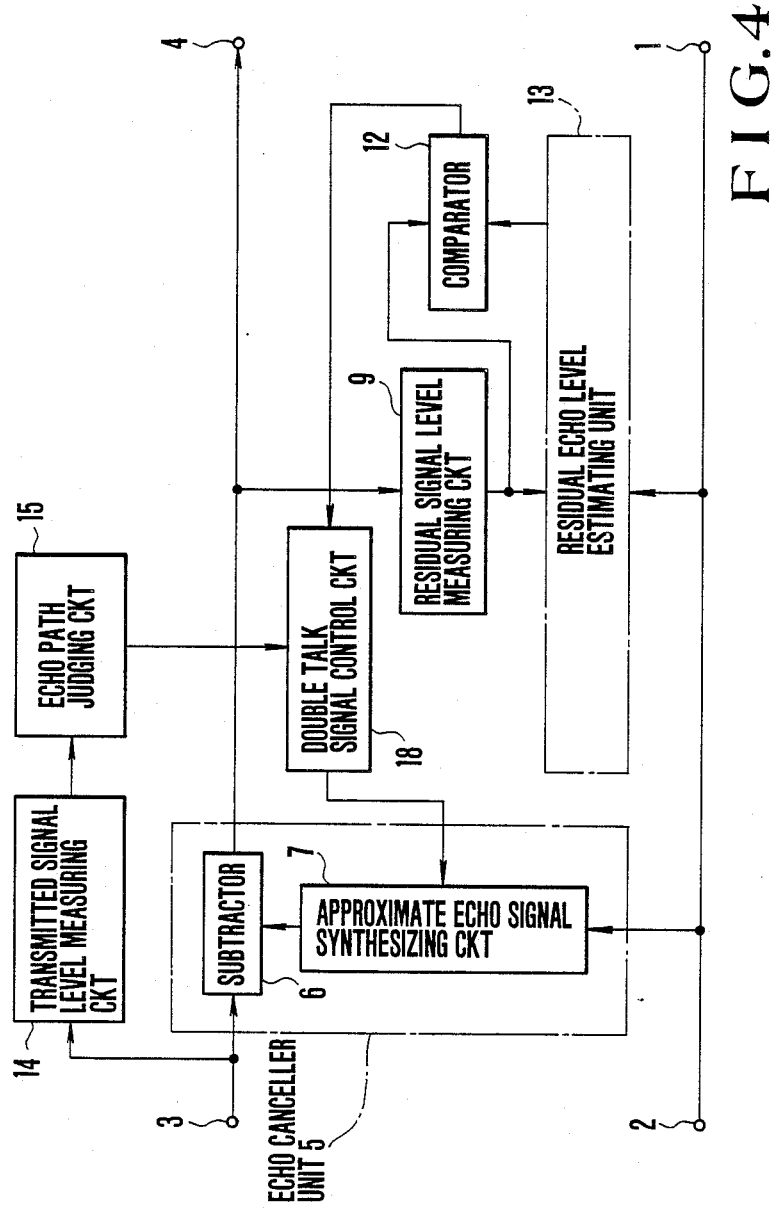
FIG. 4 is a block diagram showing still another embodiment of this invention.

FIG. 4 shows another embodiment of this invention, in which elements corresponding to those shown in FIG. 2 are designated by the same reference numerals. The embodiment shown in FIG. 4 is different from that shown in FIG. 2 in that there is provided a double talk signal control circuit 18 that controls the output of the comparator 12 in accordance with the output of an echo path open state detector, that is, the echo path judging circuit 15.

In this embodiment, when the echo path is open, in accordance with the output of the echo path judging circuit 15, the double talk control circuit 18 negates an erroneous judgement output from the comparator 12 to supply a single talk signal to the approximate echo signal synthesizing circuit 7. Consequently, this embodiment can also provide the same advantageous effects as the embodiment shown in FIG. 2.

As described above, according to this invention, without using a complicated circuits but with a simplified circuit construction having a circuit that detects the opened state of the echo circuit, it is possible to rapidly detect the opened state of the echo path without degrading the detection performance of the double talk under normal state, thus preventing erroneous detection of the double talk as well as degradation of the quality of the speech.

What is claimed is:

1. An echo canceller having a four-wire circuit and a two-wire circuit, the four-wire circuit including a reception-side path and a transmission-side path, an echo signal inherently occurring at a junction of the four-wire circuit and the two-wire circuit, said echo canceller being responsive to a two-wire signal and to an incoming signal supplied from said reception-side path and an outgoing signal including an echo signal, said echo canceller comprising;
residual producing means for producing an echo replica in accordance with said incoming signal and for producing a residual echo signal by subtracting said echo replica from said echo signal, under control of a control signal;
first level measuring means for measuring a level of said residual echo signal to produce a measured residual echo level;
second level measuring means for measuring a level of said outgoing signal to produce a sending signal level;
detecting means responsive to said sensing signal level for detecting an opened state of an echo path which is formed between said reception-side path and said transmission-side path via said junction of the four-wire and two-wire circuits, in order to produce an opened state indicating signal;
switching means responsive to said opened state indicating signal for selecting one of said measured residual echo level and said outgoing signal, in order to produce a selected signal;
estimating means for estimating a residual echo level based on said selected signal and said incoming signal to produce an estimated residual echo level; and
comparing means for comparing said estimated residual echo level with said selected signal to produce said control signal.

2. An echo canceller having a four-wire circuit and a two-wire circuit, said four-wire circuit including a reception-side path and a transmission-side path, an echo signal inherently occurring at a junction of the four-wire circuit and the two-wire circuit, said echo canceller being responsive to a two-wire signal and to an incoming signal supplied from said reception-side path and an outgoing signal including an echo signal, said echo canceller comprising;
residual echo producing means for producing an echo replica in accordance with said incoming signal and for producing a residual echo signal by subtracting said echo replica from said echo signal under control of a control signal;
first level measuring means for measuring a level of said residual echo signal to produce a measured residual echo level;
second level measuring means for measuring a level of said outgoing signal to produce a sending signal level;
detecting means responsive to said sending signal level for detecting an opened state of an echo path which is formed between said reception-side path and said transmission-side path via said junction of the four-wire and two-wire circuits, in order to produce an opened state indicating signal;
means responsive to said opened state indicating signal for producing said measured residual echo level to produce a decreased residual echo signal;
estimating means for estimating a residual echo level based on said decreased residual echo signal and said incoming signal to produce an estimated residual echo level; and
comparing means for comparing said estimated residual echo level with said decreased residual echo signal to produce said control signal.

3. An echo canceller having a four-wire circuit and a two-wire circuit, said four-wire including a reception-side path and a transmission-side path, an echo signal occurring at a junction of the four-wire circuit and the two-wire circuit, said echo canceller being responsive to a two-wire signal and to an incoming signal supplied from said reception-side path and an outgoing signal including an echo signal, said echo canceller comprising:
residual echo producing means for producing an echo replica in accordance with said incoming signal and for producing a residual echo signal by subtracting said echo replica from said echo signal, under control of a control signal;

first level measuring means for measuring a level of said residual echo signal to produce a measured residual echo level;

second level measuring means for measuring a level of said outgoing signal to produce a sending signal level;

detecting means responsive to said sending signal level for detecting an opened state of an echo path which is formed between said reception-side path and said transmission-side path via said junction of the four-wire and two-wire circuits, in order to produce an opened state indicating signal;

estimating means for estimating a residual echo level based on said measured residual echo level and said incoming signal to produce an estimated residual echo level;

comparing means for comparing said estimate residual level with said measured residual echo level to produce a comparison signal; and control means responsive to said opened state indicating signal for supplying said comparison signal as said control signal.

* * * * *